United States Patent [19]

Tomita

[11] 3,915,144
[45] Oct. 28, 1975

[54] STOVE APPARATUS

[76] Inventor: Rioe Tomita, 47-126 Kaimaldo Place, Kaneohe, Hawaii 96744

[22] Filed: Oct. 11, 1974

[21] Appl. No.: 514,026

Related U.S. Application Data

[63] Continuation-in-part of Ser. No. 257,718, May 30, 1972, Pat. No. 3,841,299, and a continuation-in-part of Ser. No. 466,055, May 1, 1974.

[52] U.S. Cl. .............................. 126/9 R; 126/25 B
[51] Int. Cl.² .................. A47J 37/07; F24B 03/00
[58] Field of Search ...... 126/9 R, 25 R, 25 A, 25 B, 126/59.5; 110/1 F

[56] References Cited
UNITED STATES PATENTS

| | | | |
|---|---|---|---|
| 2,513,580 | 7/1950 | Milligan | 126/25 |
| 3,209,743 | 10/1965 | Stewaky et al. | 126/25 B |
| 3,327,698 | 6/1967 | Leslie | 126/9 R X |
| 3,664,321 | 5/1972 | Chiov | 126/9 R |
| 3,765,397 | 3/1973 | Henderson | 126/25 B X |

FOREIGN PATENTS OR APPLICATIONS

| | | | |
|---|---|---|---|
| 394,433 | 1/1909 | France | 126/25 B |

*Primary Examiner*—Carroll B. Dority, Jr.
*Assistant Examiner*—Harold Joyce
*Attorney, Agent, or Firm*—James C. Wray

[57] ABSTRACT

A briquet stove has an upward and outward extending stove body with an upward supported grill and a briquet grate supported above a lower open end of the stove body. A barrel-shaped igniter body supports the stove body. The igniter body is made in upper and lower halves with an outward extended receiver rim on one of the halves for receiving the other half. A horizontal removable combustible material support, which is interchangeable with the briquet grate, extends across and inside of the lower portion. An opening is provided in the lower portion with a door for permitting ingress of combustible material and for controlling draft, and the lower portion is mounted on a wood base block. The upper and lower barrel portions fit within each other and within the stove body and for compact shipping.

Rod-like legs extend through holes in short legs on a base to raise the stove. The grill has a radially extending handle at the front and a perpendicular circumferential handle at the rear to facilitate lighting.

17 Claims, 11 Drawing Figures

FIG. 8
FIG. 10
FIG. 9
FIG. 11
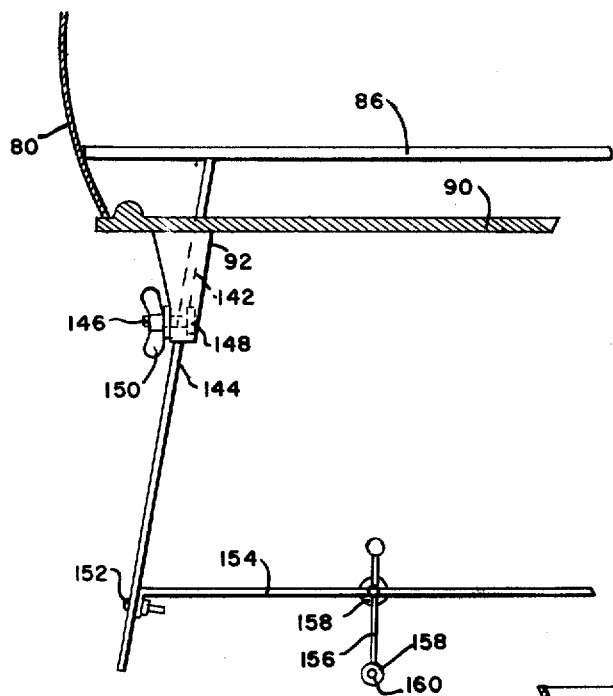
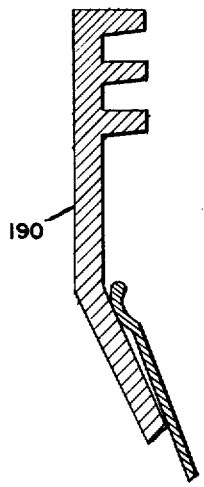
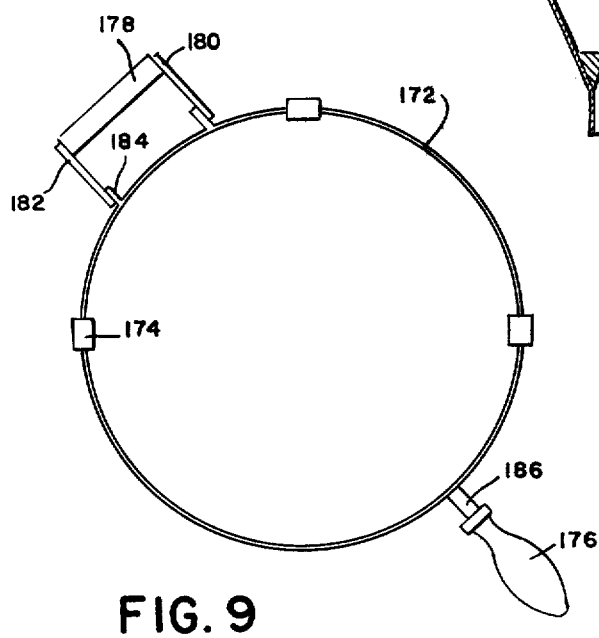
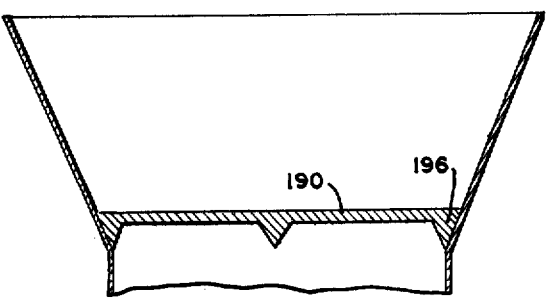

STOVE APPARATUS

BACKGROUND OF THE INVENTION

This is a continuation-in-part of copending patent application Ser. No. 257,718, now U.S. Pat. No. 3,841,299, filed May 30, 1972 for PORTABLE OUTDOOR GRILL AND FIRE STARTER UNIT and patent application Ser. No. 466,055, filed May 1, 1974 for BRIQUET IGNITING AND COOKING STOVE by Rioe Tomita.

Briquet stoves are well known. Many types of briquet stoves have been used for long periods of time with great success. Examples of such stoves are the well known large round pan which supports briquets and which has a central support for holding a circular grill made with wire crosspieces above the fire part. Variations of that type of grill have usually been directed to unique support and grill height adjustments using reciprocal center posts and various overgrill devices such as wind screens and spit supports and turners and semispherical smoker hoods.

Other types of stoves which have come into wide use are Japanese-type stoves, usually made of cast iron, having a small base with outward flared rectangular walls, a grate to support briquets above the base, and a flat cast iron grill which is grasped by a laterally extending handle to move the grill between vertical stops in parallel upstanding cleats at the back of the stove.

Other stoves have been devised in which greasedripping foods are cooked rapidly on a fire which is fueled by grease drippings and some quickly ignitable material.

It is the stoves of the briquet burning type to which the present invention is directed, since a problem exists in satisfactorily igniting briquets.

Historically, fuel briquets have been constructed in many methods from varied combustible materials. This invention deals with the igniting and use of any combustible briquet materials, for example charcoal. This invention includes the igniting and cooking with any materials which are difficult to ignite or which require other substances to ignite, such as for example lump charcoal.

Several substances have been used in the past for igniting briquets or chunks of difficult-to-ignite materials. Historically, cooking fires were kept burning, and fuel was added shortly before cooking was required. Fine, rapidly burning kindling materials have been used under the difficult-to-ignite materials. Currently, a method of igniting briquets favors the use of tailings from petroleum cracking processes with which briquets are soaked before igniting. Other methods use Calrods which are placed within piles of briquets before electricity is turned on.

Inherent difficulties and problems with those methods of ignition are well known. Some of the problems are high power use, unavailability of outlets and lack of provision for holding or storing electrical ignitors when at high temperature. Chemical ignitors often take a long time to prepare charcoal, sometimes do not ignite, and sometimes are consumed by flames without igniting charcoal. Inherent dangers of squirting the petroleum distillates on briquets which appear to be dead to reinitiate the ignition process are legend.

Some briquet type cooking stoves have made provision for igniting briquets with combustible kindling materials located beneath briquets.

To a certain extent such devices have been satisfactory in overcoming or avoiding problems of other ignition methods. However, known devices which employ ignition materials positioned beneath briquets have inherent disadvantages. One problem lies in the inability to focus flames and heat from combustible materials on briquets in their usual cooking orientation. A result is that a large amount of time is required to ignite briquets in the known devices and that briquets must be redistributed in many devices for cooking. The rearrangement and distribution of hot briquets is always an uncomfortable procedure which carries inherent danger. The use of large amounts of combustible materials may produce excessive flame and smoke and excessive ash. The use of large amounts of combustible materials requires large devices which are expensive and which are difficult to store and transport.

A collection of cooking stove devices is found in the United States Patent Office within the Official Classification of Patents, Class 126. Of particular interest in that class are disclosures classified within subclass 25. Examples of United States patents officially classified in that class, cross references of United States patents, United States patents unofficially classified within that class, foreign patents and publications collected by the examiner and available within that classification are the following U.S. Pat. Nos: 92,799; 2,894,447; 2,920,614; 3,209,743; 3,368,544; 3,494,349; 3,667,446; French 1909 patent 349,433 and German 1901 patent 119,128.

Many problems remain in prior art devices for the igniting of briquets or other difficult-to-ignite materials.

One problem existing with other devices is that the ignition of briquets is somewhat retarded by the lack of rapidly raising heat and focusing the heat on a small amount of briquets. Another problem which exists in igniting devices for briquet stoves is that the igniting devices may be cumbersome and may cause additional shipping, storage and freight expense problems which create higher priced stoves and which reduce attractiveness.

SUMMARY OF THE INVENTION

The present invention overcomes many of the problems which exist in briquet stoves and, particularly which exist in stoves with briquet ignition aids. The stove of the present invention fits within a small package, no larger than or only slightly larger than packages associated with conventional briquet stoves without ignition devices. Shipping, storage and freight problems are alleviated.

The present stove intensely focuses from ignition materials while providing wide space for spreading of ignition materials and for air contact with burning ignition materials.

The present invention provides wide space for the additional bulky ignition sustainig materials which may augment or supplant the usual crushable ignition materials and which may augment or supplant the briquets in the stove.

In a preferred form of the invention, the stove is constructed with an igniter body supporting a stove body. Igniter body has a wide central portion and a narrow upper portion. The igniter body of the preferred embodiment also has a narrow lower end. Upper and lower portions of the igniter body are separable and are held together by a receiver in the form of a cuff which joins the body portions. Preferably, the cuff is formed by outwardly bending a rim on one of the large ends of one portion so that the rim receives the large end of the other portion. The junction of the integrally formed rim and side wall of one portion forms a shelf against which the end of the other portion rests.

In one embodiment of the invention, the rim fits closely but not tightly so that the two portions may be separated to add bulky combustible materials such as wood scraps. In that embodiment, it is desirable to support the combustible materials on a grate which is supported within the lower portion on cleats or bolts about half way between the top and bottom of the lower portions. A grate resting on those cleats or bolts support the combustibles a suitable distance below briquets on the stove body grate so that flames from these combustibles produce their hottest conical points in the area of briquets resting on the grates. The grate supported in the lower igniter section has the further advantage of supporting fire sustaining combustibles sufficiently below the food holding grill so that foods may be cooked on the grill while the combustibles are flaming.

In a preferred form of the invention, the lower igniter portion has a door for permitting ingress of rapid ignition material such as crushed paper and for controlling draft in the ignition body and through the stove body. The door opening is positioned in the side wall of the lower igniter portion at a point so that the lower edge of the opening is adjacent an ash pan within the igniter. In one embodiment, the ash pan is an integrally formed end plate of the lower igniter portion.

In a preferred embodiment, the ash pan is a floor plate supported on inward projecting cleats on the side wall of the lower portion, near an open lower end. In that embodiment, the door opening is slightly raised from the lower end of the side wall. The lower portion is supported on a circular rim on which the side wall edges rest. The rim has a raised rim guide spaced inward from the outward edges to insure that the lower side wall edge remains firmly positioned. Four downward projecting legs are integrally case with the stove base. Lower ends of the legs rest upon a wood block, and the entire lower assembly is held together by long lip screws which extend through the holes in the ash floor downward through the cast base into the wood block. In that construction, the ash floor and base plate and legs form a stove body which may be readily cleaned of debris and accumulated grease. In shipping, the base plate and ash floor may be stored within the nested elements, resulting in a saving of freight charges and storage space and preventing damage to fragile cast materials during shipping.

In a preferred embodiment of the invention, the ignition body is usable with stove bodies of varied sizes. The upper portion of the ignition body has at its upper end a cylindrical rim integrally formed with the side wall. Within the cylindrical rim of the upper ignition body portion fits a similar, slightly smaller rim of a stove body.

In one embodiment, the stove body has an upward and outward frusto-conical side wall which terminates in an upper edge configured for receiving food supporting grill portion. In a preferred embodiment of the stove body, the upper edge is scalloped to provide lateral outward flow of heat and flame for sustaining combustion temperatures while preventing overcooking at temperatures higher than desirable.

In one form of the invention, a removable briquet grate may rest on a ledge formed at the intersection of the stove body side wall and depending rim. In a preferred embodiment of the invention, the briquet grate is anchored between inward projecting rests and bolts and nuts which hold handles on the stove body. In the preferred form of the invention, handles are provided both on the stove body and on the lower portion of the ignition body so that the sections of the stove apparatus may be transferred or disassembled when hot.

In a larger embodiment, the stove body side walls extend outward and then upward to an edge which holds a large food supporting grill. In that embodiment, the inner extremity of the horizontally extending wall portion of the stove body has a downward and inward bent grate rest shelf which in turn supports the dependent rim.

The grate rest shelf supports the grate so that its upper surface is substantially level with the horizontal surface of the stove body to permit free movement of briquets. In another preferred embodiment, the top of the grate is held slightly above the horizontal portion of the stove body wall so that heat retaining sand may be laid on the horizontal portion, providing a contiguous and even sand and grate upper surface.

In using the stove, the upper body portion is lifted, and wood scraps or other bulky combustibles are rested on a grate in the lower portion. Double sheets of newspaper are twisted into conical forms, with the large ends up and the pointed ends pointing downward. The crumpled newspaper is inserted through the lower vent opening. Alternatively, it may be laid on the grate. The newspaper is ignited through the lower vent opening, and flames and heat rise to quickly ignite briquets on the stove body grate. After the briquets have been ignited, usually in about 3 minutes, the lower door is closed, and the stove is ready for cooking food.

One object of the invention is the provision of briquet stove apparatus having a base for mounting on the ground, a two-part, barrel-shaped igniter body having separable upper and lower portions, the lower portion having a relatively small end and a relatively large opposite end and having a side wall, a door opening in the side wall near a lower end, the upper portion having a side wall terminating in relatively small and large opposite ends, a holder holding the body assembled and an upper stove body connected to the upper open end of the upper portion and extending upward therefrom.

Another object of this invention is the provision of an igniter body with a horizontal member positioned in the lower portion and supported within the lower portion spaced from the upper and lower ends thereof for supporting combustible materials on the horizontal member.

Another object of this invention is the provision of a stove igniter body with inward projecting supports mounted in the side wall medially between the upper and lower ends of the lower portion and wherein the horizontal member comprises an open work grate for holding combustible materials above a bottom of the igniter body.

Another object of the invention is the provision of stove igniter apparatus with supports mounted within a lower portion above a lower end and beneath an opening in a side wall and with a removable ash floor mounted on the supports for holding ashes at a level of the opening in the side wall.

The invention provides a stove igniter apparatus with a cylindrical upward extending rim formed in the upper open end and wherein the stove body has a slightly smaller downward depending cylindrical rim for fitting within the cylindrical rim of the upper portion of the igniter body.

Another object of the invention is the provision of a stove body having an upward extending side wall integrally formed with an inward extending base wall terminating in a central grill receiving opening and further comprising a rectangular downward and inward extending ledge around the grill receiving opening for supporting the grill, and with cylindrical rim extending downward from an inward edge of the ledge.

The invention has as another objective the provision of stove igniter apparatus with an open lower end, a flat base with an upward extending rim guide integrally formed with the base and spaced inward from lateral edges of the base, whereby the lower end of the side wall of the lower portion is placed on the base outward of the rim, legs connected to the base and extending downward therefrom, a wood block mounted at bottoms of the legs, a floor mounted within the bottom portion above the open lower end and having lateral dimensions greater than the lower open end and screw fasteners extending through the floor and base into the wood base, thereby holding the lower portion, floor, base, legs and block assembled.

These and other objects and features of the invention are apparent in the disclosure, which includes the foregoing and ongoing specification and claims, and the drawings.

BRIEF DESCRIPTION OF THE DRAWING

FIG. 8 is a detail of a four-leg support.

FIG. 9 is a detail of a preferred grill.

FIG. 10 is a detail of grill supports.

FIG. 11 is a detail of a preferred grate.

DETAILED DESCRIPTION OF THE DRAWINGS

Figure 1:
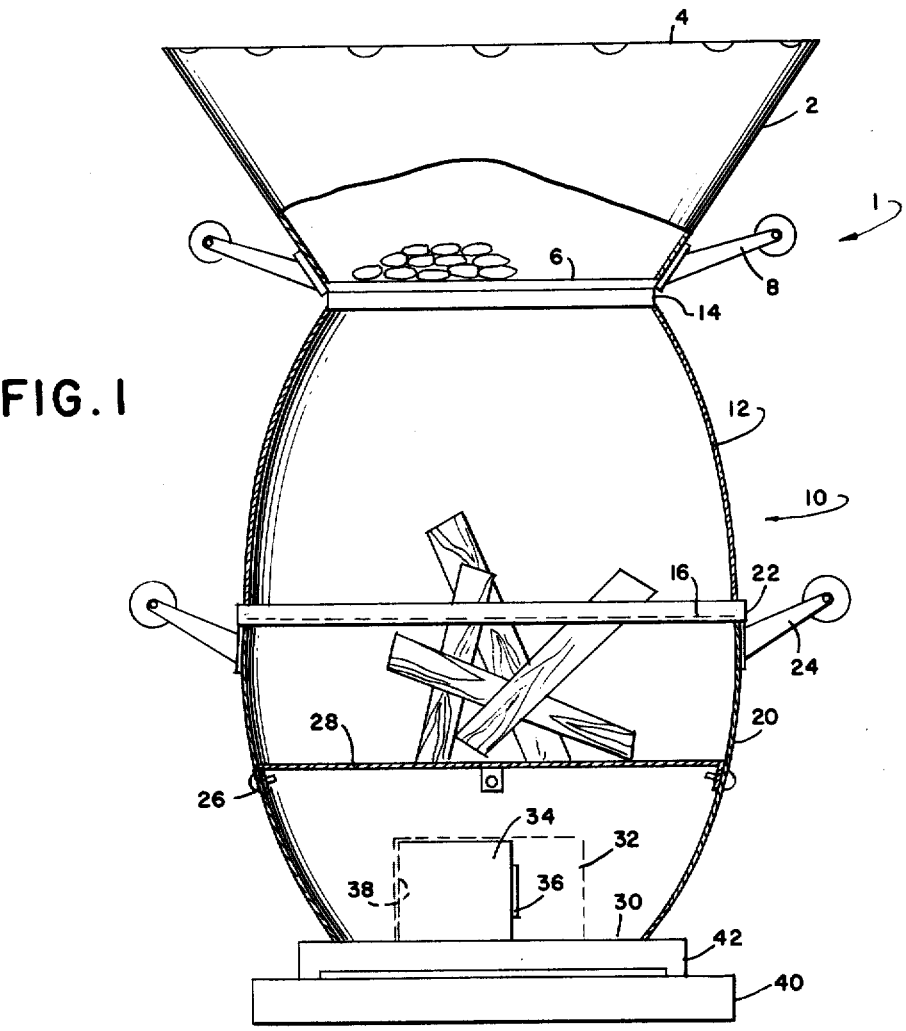
FIG. 1 is a side elevation partially cut away showing elements of the igniter stove invention.

Referring to FIG. 1, an igniter stove is generally indicated by the numeral 1. The stove body has a frusto-conical upward and outward sloping wall 2. An upper edge 4 of the conical stove body is configured for receiving a food holding grill. Upper edges are scalloped and relieved to provide vents for permitting heat and flame to escape laterally around edges of the grill.

A briquet holding grate 6 is provided near the open bottom of the stove. Edges of the grate are sloped to conform to side wall 2 of the stove body. In a preferred form, the grate is configured as shown in copending parent applications.

Handles 8 are provided on opposite sides of the stove body to lift the stove body.

An igniter body generally represented by the numeral 10 supports the stove body. The igniter body has a barrel shape and is formed in two portions. An upper portion has a curved side wall 12 which terminates upwardly in a cylindrical rim 14, which surrounds an open and relatively small upper end. Lower end 16 is a straight edge which surrounds a relatively large opening.

The stove body is supported on rim 14 by a similar, slightly smaller rim on the stove body which fits within rim 14.

The lower portion of the igniter body has a curved side wall 20, which has a receiver 22 in the form of an integral outwardly bent rim. Receiver 22 holds the lower end of the upper portion side wall 12. A handle 24 is connected to side wall 20 beneath rim 22. Handles 24 are used to move the entire assembly. In the present embodiment, handles 8 are used to lift the stove body 2 and the upper portion 12 so that combustible materials may be added to the igniter body.

Bolts 26 are provided medially in side wall 20, and a combustible supporting horizontal grate member 28 is supported by bolts 26. Grate 28 holds scraps of wood or other large combustion sustaining materials for igniting briquets or for supporting briquets when grilling food.

The relatively small bottom end of the lower portion is closed by a base plate 30. A door opening is formed in side wall 20 near base plate 30, and the rectangular frame 32 is mounted around the door opening. Door 34 is moved to the left with handle 36 to cover the door opening, which is represented by the numeral 38. Fully opening door 34 permits entry of paper for ingition and permits the removal of ash. During combustion, door 36 is partially closed to control the rate of air flow up through the bottom of the combustible materials. Preferably, the paper is placed in the igniter body in twisted double sheets with large ends up.

The base plate 30 is connected to U-shaped steel brackets 42, and brackets 42 are connected by screws to a wooden stand 40. The space between the wood block 40 and base plate 30 within brackets 42 is used for storing grates.

Figure 2:
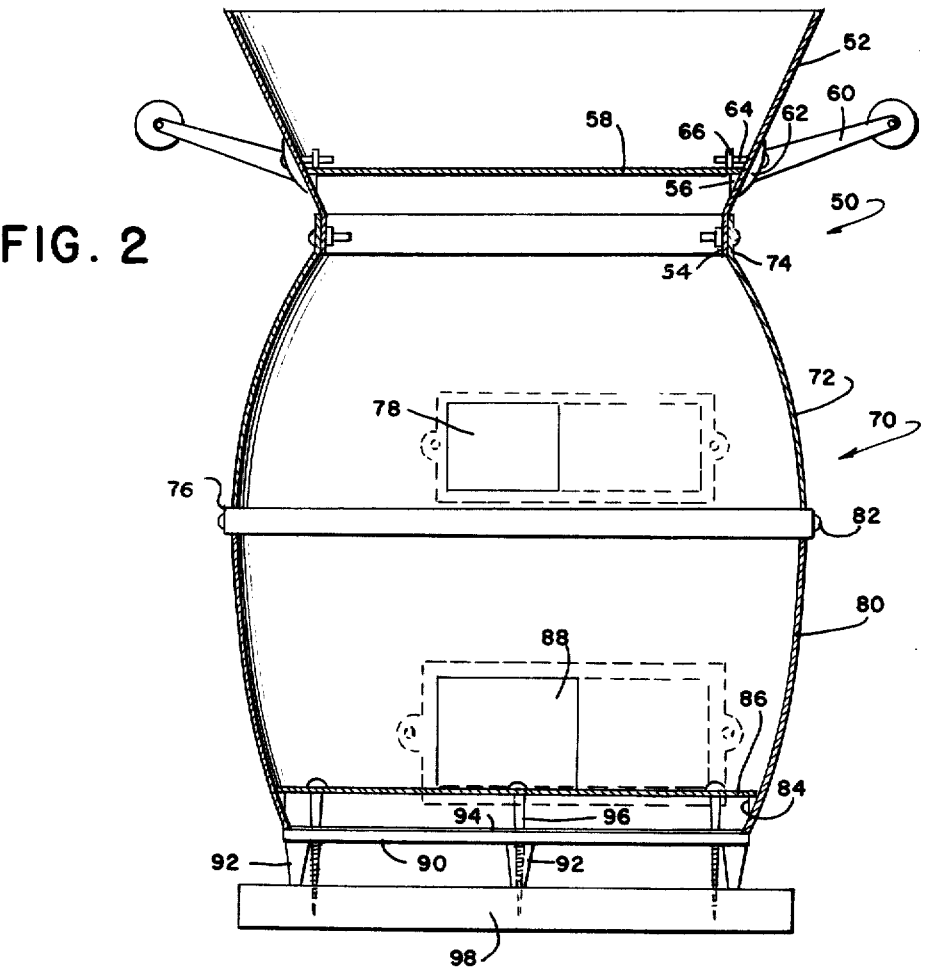
FIG. 2 is a detail of an alternate form of the invention.

Referring to FIG. 2, an alternate form of the igniter stove has a similarly shaped stove body 52. Just above the cylindrical rim 54 on the stove body are inward projections 56 which hold grate 58. Handles 60 are connected to the stove body with flanges 62 through which bolts 64 are placed. Nuts 66 hold the handles and also hold grate 58 between nuts 66 and supports 56.

The barrel-shaped stove body 70 has an upper portion with a curved side wall 72 which terminates upwardly in a cylindrical rim 74 surrounding a relatively small open end. The relatively large open lower end of the upper portion is formed as an outward bent receiver 76 which holds the upper open end of the lower portion. A door 78, having square dimensions of 1 ½ inches, is provided in the upper portion 72 for movement within a rectangular frame to selectively open and close a draft opening.

A lower portion of the igniter body has a curved wall 80. The lower portion is connected to the upper portion by bolts 82. Similar bolts between upper rim 74 of the igniter portion and rim 54 of the stove portion hold the entire assembly together. Thus, handles 60 are used to move the entire assembly as a unit.

Inward projecting stops 84 are provided on wall 80, and a removable horizontal ash floor member 86 rests upon stops 84. A door 88 is provided within the rectangular frame, which extends laterally from a door opening, just above ash floor 86. As an example, the door opening and door are approximately three inches by three inches square. A base 90 is a flat circular or annular plate with an upward projected rim 94. The lower edge of wall 80 rests on base plate 90 and is held just outside of rim 94.

Four legs 92 are integrally case with the base plate 90, and four wood screws 96 extend downward through holes in the ash floor 86 and through the base plate 90 inward of legs 92 into wood base block 98.

Figure 3:
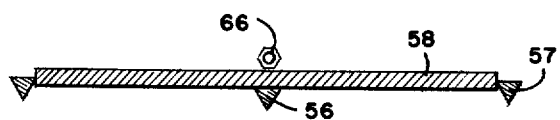
FIGS. 3 and 4 are details of grate mountings.
Figure 4:
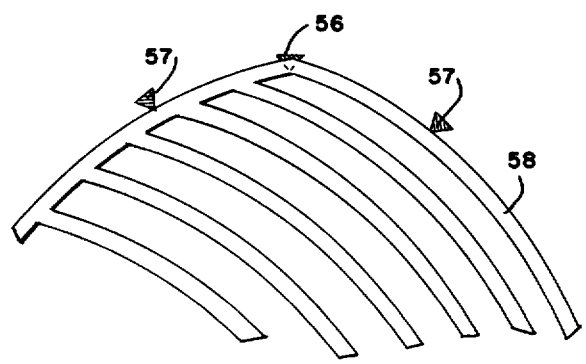

In a preferred embodiment of the invention, the briquet grate 58 is generally elliptical with four corners as described in the copending applications. As shown in detail in FIG. 3 and 4, the grate 58 is supported on supports 56 and is held downward by nut 66. Lateral supports 57 as shown in FIG. 4 prevent turning of grate 58.

Figure 5:
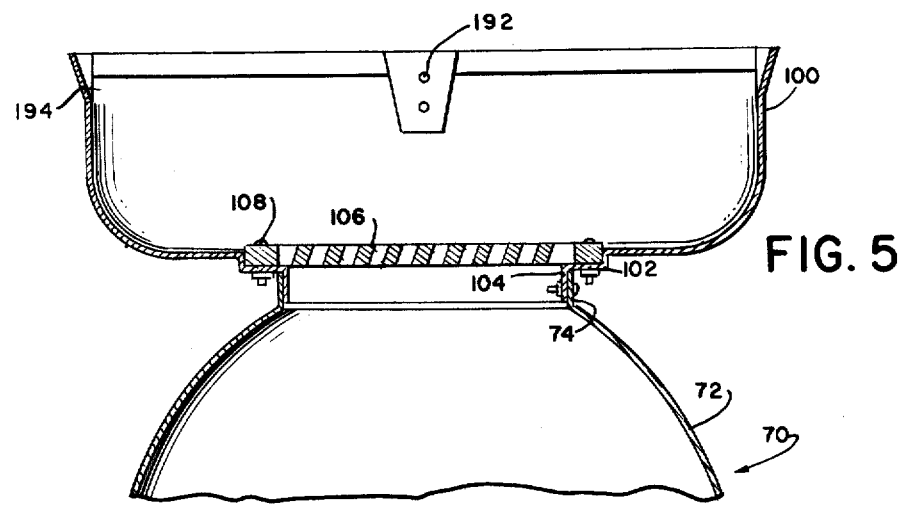
FIG. 5 is a detail of an alternate stove body.

An alternate stove body is shown in FIG. 5. Stove body 100 has a vertical portion and a horizontal portion. A shelf 102 is formed as a depression at the inward edge of the horizontal portion of the stove body. Rim 104 extends downward from the inward extremities of shelf 102 to engage a complementary rim 74 on igniter body portion 72.

Grate 106 rests on shelf 102, and bolt 108 extends through the grate and shelf to hold the stove body assembled. The upper surface of grate 106 is raised slightly above the horizontal surface of stove body 100 to provide space for heat flow insulating sand.

Figure 6:
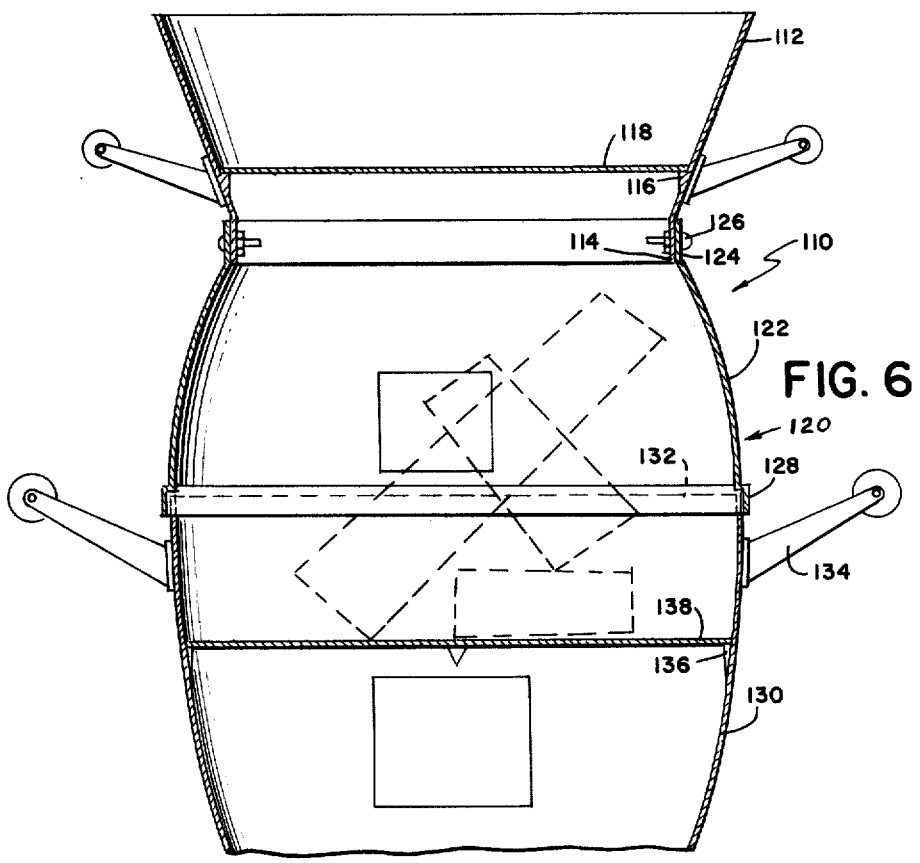
FIG. 6 is a detail of an alternate igniter.

In FIG. 6 an alternate form of the invention is generally referred to by the numeral 110. Stove body 112 has a lower rim 114 and has supports 116, which support a removable grate 118. The igniter body 120 has an upper portion 122 which terminates upwardly in a rim 124. Rims 114 and 124 are joined by bolts 126. The downward end of upper portion 122 is an outward extended receiver 128. Receiver 128 holds the upper end 132 of lower portion 130. Handles 134 are provided on the lower portion. The lower portion has inward projecting supports 136 which hold a removable grate 138 for the burning of combustible materials such as wood.

In preferred embodiments, grates 118 and 138 are identical and interchangeable, as are grates 28 and 6 shown in FIG. 1.

Figure 7:
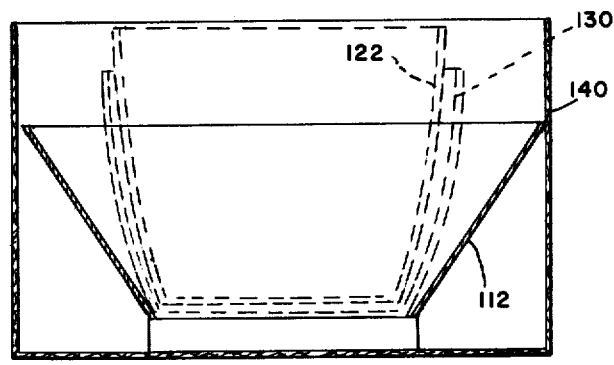
FIG. 7 is a schematic representation of elements of the igniter stove packed for shipment.

In FIG. 7, a carton 140 holds compactly interfitted elements. The upper portion 122 of the igniter body is fitted within the lower portion 130, and both are fitted with the stove body 112. Other elements of the assembly such as handles and grates are wrapped in paper and packaged within the igniter bodies.

A shown in FIG. 8, legs 92 and base plate 90 are integrally cast and have holes 142 through which 7/16 inch rods 144 extend. A bolt 146 extends through a transverse, horizontal hole in the leg 92. Bolt head 148 extends into an enlarged portion of the hole which communicates with the leg hold 142. Tightening wing nut 150 on bolt 146 draws one side of bold head 148 tight against leg 144 in hole 142, securely anchoring the leg 144 and hole 142.

As shown, legs 144 may extend upward to the floor plate 86 to cooperate with the stove wall 80 in supporting the floor plate.

At the lower end of leg 144 a bolt 152 through a hole in a flattened portion of the leg 144 connects a stabilizer bar 154 which extends across to a similar leg, not shown. In a four-leg model, a cross-bar 156 is joined to stabilizer bar by a hold through an enlarged central portion 158. Opposite ends of bar 156 are bent downward and flattened and enlarged forming ends 158 with holes 160 for receiving bolts secured to opposite legs.

A preferred form of grill is shown in FIG. 9. Grill 172 rests upon grill supports 174 having three inward facing slots and extending upward from a stove body in a convention configuration. Grill supports 174 are located at the sides of grill 172 and at the rear of grill 172 so that the grill may be slid into the desired slots in the support. The grill is provided with a radially extending handle 176 on its forward side and with a perpendicular circumferentially oriented handle 178 at its rear side. The position of the handles shown in FIG. 9 is of proper configuration for use by a right-handed person who grips handle 176 with his right hand and handle 178 with his left hand and slides the grill forward out of the grill supports and then lifts the grill to the desired position, using both handles.

Handle 178 is a conventional wooden dowel drilled through its center with a bolt 180 holding the dowel between outward extending plates 182 which are welded or otherwise connected to lugs 184 integrally formed in spaced positions on the grill circumference. Handle 176 is mounted in a conventional manner on a lug 186 which extends radially from the grill circumference.

Conventional grill supports 190, as shown in FIG. 10, are mounted with bolts extending through holes 192 on outward extended sections 194 of the stove body 100.

In a preferred embodiment of the grates, as shown in FIG. 11, four downward triangularly shaped guide supports 196 are integrally formed on grate 190 to hold the grate within the stove body.

While the invention has been described with reference to specific embodiments, variations and modifications of the invention may be made by those skilled in the art without departing from the scope of the invention. The scope of the invention is defined in the following claims.

I claim:

1. Briquet stove apparatus comprising a base for mounting on the ground, a two-part, barrel-shaped igniter body having separable upper and lower portions, the lower portion having a relatively small lower end and a relatively large upper open end and having a side wall, a door opening in the side wall near the lower end, and a door frame connected to the side wall around the opening and extending laterally therefrom, a door mounted in the door frame for sliding to open and close and selectively partially close the opening, the upper portion having a side wall terminating upwardly in a relatively small open upper end and terminating downwardly in a relatively large open lower end, a receiver connected to one of the relatively large open ends of the portions for receiving the other large open end portions, thereby holding the body assembled, and further comprising an upper stove body connected to the upper open end of the upper portion and extending upward therefrom, the stove body having an open upper end, grill means connected to the upper open end of the stove body, grate means mounted in a lower open end of the stove body, and handles extending outward from the stove body.

2. The stove apparatus of claim 1 further comprising a horizontal member positioned in the lower portion and supported within the lower portion spaced from the upper and lower ends thereof for supporting combustible materials on the horizontal member.

3. The stove apparatus of claim 2 further comprising inward projecting supports mounted in the side wall medially between the upper and lower ends of the lower portion and wherein the horizontal member comprises an open work grate supported on the supports for holding combustible materials above the door opening in the side wall.

4. The apparatus of claim 2 further comprising supports mounted within the lower portion above the lower end and beneath the opening in the side wall and wherein the horizontal member comprises a removable ash floor mounted on the supports for holding ashes at a level of the opening in the side wall.

5. The stove apparatus of claim 1 wherein the receiver comprises an outward bent lip around one of the larger open ends for receiving the other larger open end.

6. The stove apparatus of claim 5 further comprising inward projecting threaded fasteners extending through the receiver and a side wall at the other open end.

7. The stove apparatus of claim 1 wherein a cylindrical upward extending rim is formed in the upper open end of the upper portion and wherein the stove body has a slightly smaller downward depending cylindrical rim for fitting within the cylindrical rim of the upper portion of the igniter body.

8. The stove apparatus of claim 7 wherein the stove body comprises a body having an upward extending side wall integrally formed with an inward extending base wall terminating in a central grill receiving opening and further comprising a rectangular downward and inward extending ledge around the grill receiving opening for supporting the grill, and wherein the cylindrical rim extends downward from an inward edge of the ledge.

9. The stove apparatus of claim 1 wherein the lower end of the lower portion is open, and wherein the base comprises a flat plate with an upward extending rim guide integrally formed with the plate and spaced inward from lateral edges of the plate, whereby the lower end of the side wall of the lower portion is placed on the plate outward of the rim, legs connected to the plate and extending downward therefrom, a wood base block mounted at bottoms of the legs, a floor mounted within the bottom portion above the lower open end and having lateral dimensions greater than the lower open end and screw fasteners extending through the floor and plate into the wood base, thereby holding the lower portion, floor, plate, legs and base block assembled.

10. The stove apparatus of claim 1 wherein the opening in the side wall of the lower portion is adjacent the lower end of the lower portion and wherein the lower end of the lower portion is closed, and wherein the base comprises brackets connected to the closed lower end of the lower portion and a wood block base connected to the brackets.

11. The stove apparatus of claim 1 wherein the base comprises downward extending legs and wherein the legs have holes extending from a bottom of the legs upward and inward at a slight angle to vertical and further comprising rods mounted in the holes and extending downward for raising the stove body from the floor.

12. The stove apparatus of claim 11 wherein the holes in the legs extend through the legs and the base and further comprising engagement means mounted in the legs for engaging the rods and holding the rods in the legs.

13. The apparatus of claim 12 wherein the engagement rings comprise transverse holes in the legs across the rod-receiving holes and bolts mounted in the transverse holes, the bolts having heads engaging the rods, whereby tightening the bolts secures the rods in the rod-receiving holes.

14. The stove apparatus of claim 11 further comprising bolts connected to lower ends of the rods and crossbars connected to the latter bolts for securing lower ends of the rods.

15. The stove apparatus of claim 1 wherein the grill means comprises a circular grill having a radially extending front handle and having a perpendicular, circumferentially oriented rear handle opposite the front handle.

16. The apparatus of claim 1 wherein the stove body has an upper extremity having outward bent portions for receiving grill supports.

17. The stove apparatus of claim 1 wherein the grate has integrally formed downward triangular appendages at opposite positions on a circumference.

* * * * *